(12) United States Patent
Choi et al.

(10) Patent No.: US 10,536,697 B2
(45) Date of Patent: Jan. 14, 2020

(54) METHOD FOR RE-ENCODING IMAGE AND APPARATUS THEREFOR

(71) Applicant: Samsung Electronics Co., Ltd., Gyeonggi-do (KR)

(72) Inventors: Dai-woong Choi, Seoul (KR); Woong-il Choi, Gyeonggi-do (KR); Dae-sung Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 153 days.

(21) Appl. No.: 15/517,357

(22) PCT Filed: Dec. 29, 2014

(86) PCT No.: PCT/KR2014/012985
§ 371 (c)(1),
(2) Date: Apr. 6, 2017

(87) PCT Pub. No.: WO2016/056709
PCT Pub. Date: Apr. 14, 2016

(65) Prior Publication Data
US 2017/0318291 A1 Nov. 2, 2017

(30) Foreign Application Priority Data
Oct. 6, 2014 (KR) .................. 10-2014-0134478

(51) Int. Cl.
*H04N 19/124* (2014.01)
*H04N 19/184* (2014.01)
(Continued)

(52) U.S. Cl.
CPC ......... *H04N 19/124* (2014.11); *H04N 19/184* (2014.11); *H04N 19/625* (2014.11); *H04N 19/91* (2014.11)

(58) Field of Classification Search
CPC .... H04N 19/124; H04N 19/40; H04N 19/172; H04N 19/91; H04N 19/184; H04N 19/625; H04N 19/126
See application file for complete search history.

(56) References Cited

U.S. PATENT DOCUMENTS 5,933,194 A  8/1999  Kim et al.
6,256,422 B1 * 7/2001  Mitchell ............... G06F 17/147
                                                    375/240.17
(Continued)

FOREIGN PATENT DOCUMENTS

CN    1288336    3/2001
JP    06338802   12/1994
(Continued)

OTHER PUBLICATIONS

PCT/ISA/210 Search Report issued on PCT/KR2015/012985 (pp. 9).
(Continued)

*Primary Examiner* — Yon J Couso
(74) *Attorney, Agent, or Firm* — The Farrell Law Firm, P.C.

(57) ABSTRACT

Provided is a re-encoding method including obtaining a first quantization table from a bitstream including an image encoded using the first quantization table; obtaining a second quantization table based on a pattern representing a size distribution of values of elements of the first quantization table, the second quantization table including elements respectively corresponding to the elements of the first quantization table; and re-encoding a reconstructed image by using the second quantization table, the reconstructed image being obtained by decoding the encoded image by using the first quantization table.

12 Claims, 11 Drawing Sheets

(51) Int. Cl.
*H04N 19/625* (2014.01)
*H04N 19/91* (2014.01)

(56) References Cited

U.S. PATENT DOCUMENTS

| | | |
|---|---|---|
| 6,580,650 B2 | 6/2003 | Ellis et al. |
| 6,590,936 B1 | 7/2003 | Kadono |
| 6,606,418 B2 | 8/2003 | Mitchell et al. |
| 6,850,650 B1 | 2/2005 | Bauschke et al. |
| 2003/0133512 A1* | 7/2003 | Moni .............. H04N 19/176 375/246 |
| 2004/0160625 A1 | 8/2004 | Kondo |
| 2005/0078748 A1 | 4/2005 | Moni et al. |
| 2006/0133479 A1 | 6/2006 | Chen et al. |
| 2007/0230805 A1 | 10/2007 | Yamada et al. |
| 2008/0298469 A1* | 12/2008 | Liu .............. H04N 19/15 375/240.26 |
| 2012/0201476 A1* | 8/2012 | Carmel .............. H04N 19/176 382/239 |
| 2013/0336594 A1 | 12/2013 | Dorairaj |
| 2016/0366422 A1* | 12/2016 | Yin .............. H04N 19/117 |

FOREIGN PATENT DOCUMENTS

| | | |
|---|---|---|
| JP | 2003153011 | 5/2003 |
| JP | 2004040300 | 2/2004 |
| JP | 2005503681 | 2/2005 |
| JP | 2006180497 | 7/2006 |
| KR | 1020080044859 | 5/2008 |
| KR | 1020100011288 | 2/2010 |
| WO | WO 2006/011197 | 2/2006 |

OTHER PUBLICATIONS

PCT/ISA/237 Written Opinion issued on PCT/KR2015/012985 (pp. 5).
Korean Office Action dated Mar. 23, 2016 issued in counterpart application No. KR1020140134478 (pp. 6).
Korean Notice of Allowance dated Nov. 24, 2016 issued in counterpart application No. KR1020140134478 (pp. 2).
European Search Report dated Jul. 19, 2017 issued in counterpart application No. 14903702.0-1905, 13 pages.
Chinese Office Action dated Apr. 28, 2019 issued in counterpart application No. 201480083567.8, 19 pages.

* cited by examiner

FIG. 3A

|     311 | 312 | 313 | 314 | 315 |     |     |     |
|---|---|---|---|---|---|---|---|
| 32 | 31 | 30 | 33 | 62 | 90 | 122 | 151 |
| 31 | 31 | 31 | 60 | 60 | 150 | 150 | 120 |
| 32 | 33 | 30 | 61 | 90 | 150 | 180 | 120 |
| 32 | 30 | 60 | 60 | 124 | 210 | 180 | 152 |
| 30 | 61 | 90 | 120 | 150 | 270 | 240 | 180 |
| 60 | 93 | 119 | 150 | 179 | 240 | 273 | 210 |
| 124 | 151 | 180 | 210 | 240 | 302 | 300 | 240 |
| 180 | 210 | 240 | 243 | 271 | 241 | 240 | 242 |

| 321 | 322 | 323 | 324 | 325 |     |     |     |
|---|---|---|---|---|---|---|---|
| 1 | 1 | 1 | 1 | 2 | 3 | 4 | 5 |
| 1 | 1 | 1 | 2 | 2 | 5 | 5 | 4 |
| 1 | 1 | 1 | 2 | 3 | 5 | 6 | 4 |
| 1 | 1 | 2 | 2 | 4 | 7 | 6 | 5 |
| 1 | 2 | 3 | 4 | 5 | 9 | 8 | 6 |
| 2 | 3 | 4 | 5 | 6 | 8 | 9 | 7 |
| 4 | 5 | 6 | 7 | 8 | 10 | 10 | 8 |
| 6 | 7 | 8 | 8 | 9 | 8 | 8 | 8 |

| 331 | 332 | 333 | 334 | 335 |     |     |     |
|---|---|---|---|---|---|---|---|
| 50 | 50 | 50 | 50 | 100 | 150 | 200 | 250 |
| 50 | 50 | 50 | 100 | 100 | 250 | 250 | 200 |
| 50 | 50 | 50 | 100 | 150 | 250 | 300 | 200 |
| 50 | 50 | 100 | 100 | 200 | 350 | 300 | 250 |
| 50 | 100 | 150 | 200 | 250 | 450 | 400 | 300 |
| 100 | 150 | 200 | 250 | 300 | 400 | 450 | 350 |
| 200 | 250 | 300 | 350 | 400 | 500 | 500 | 400 |
| 300 | 350 | 400 | 400 | 450 | 400 | 400 | 400 |

| 341 | 342 | 343 | 344 | 345 | | | |
|---|---|---|---|---|---|---|---|
| 48 | 49 | 50 | 54 | 110 | 165 | 180 | 225 |
| 55 | 55 | 54 | 114 | 110 | 250 | 250 | 200 |
| 54 | 53 | 52 | 110 | 165 | 250 | 300 | 200 |
| 52 | 51 | 110 | 106 | 200 | 350 | 300 | 250 |
| 51 | 106 | 150 | 200 | 250 | 450 | 400 | 300 |
| 106 | 165 | 200 | 250 | 300 | 400 | 450 | 350 |
| 200 | 250 | 300 | 350 | 400 | 500 | 500 | 400 |
| 300 | 350 | 400 | 400 | 450 | 400 | 400 | 448 |

| 351 | 352 | 353 | 354 | 355 | | | |
|---|---|---|---|---|---|---|---|
| 40 | 49 | 45 | 55 | 120 | 170 | 190 | 270 |
| 55 | 55 | 55 | 120 | 120 | 250 | 250 | 200 |
| 54 | 53 | 52 | 110 | 165 | 250 | 300 | 200 |
| 52 | 51 | 110 | 106 | 200 | 350 | 300 | 250 |
| 51 | 106 | 150 | 200 | 250 | 450 | 400 | 300 |
| 106 | 165 | 200 | 250 | 300 | 400 | 450 | 350 |
| 200 | 250 | 300 | 350 | 400 | 500 | 500 | 400 |
| 300 | 350 | 400 | 400 | 450 | 400 | 400 | 430 |

—356

METHOD FOR RE-ENCODING IMAGE AND APPARATUS THEREFOR

PRIORITY

This application is a National Phase Entry of PCT International Application No. PCT/KR2014/012985, which was filed on Dec. 29, 2014, and claims priority to Korean Patent Application No. 10-2014-0134478, which was filed on Oct. 6, 2014, the contents of each of which are incorporated herein by reference.

TECHNICAL FIELD

The present disclosure relates to a method of re-encoding an image to increase compression efficiency of the image.

BACKGROUND ART

As hardware for reproducing and storing high-resolution or high-quality video content is being developed and supplied, a need for a compression scheme for effectively encoding or decoding the high-resolution or high-quality video content is increasing.

In particular, since the amount of information contained in a digital video signal is very large, it is indispensable to compress video data so as to efficiently store, detect, and transmit the information.

Thus, many video-data compression techniques have been developed. A Joint Photographic Experts Group (JPEG) format which is an international standard still-image compression format has been introduced in relation to video compression techniques.

However, a compression rate according to the JPEG format is no higher than that of an image compression format that is widely compatible or other latest image compression formats.

Recently, technology of re-encoding a JPEG image to increase compression performance with the same image quality has been disclosed. In this technology, a JPEG image is re-encoded to reduce required memory and transmission costs.

DETAILED DESCRIPTION OF THE INVENTION

Technical Problem

The present disclosure provides a method of re-encoding an image with high compression efficiency.

Technical Solution

Provided are a method and apparatus for re-encoding an encoded image to increase compression efficiency of the encoded image.

According to various embodiments, a re-encoding method may include obtaining a first quantization table from a bitstream including an image encoded using the first quantization table; obtaining a second quantization table based on a pattern representing a size distribution of values of elements of the first quantization table, the second quantization table including elements corresponding to the elements of the first quantization table; and re-encoding a reconstructed image by using the second quantization table, the reconstructed image being obtained by decoding the encoded image by using the first quantization table.

DESCRIPTION OF THE DRAWINGS

FIG. 3A to 3E are diagrams illustrating a method of obtaining a quantization table to be used in a re-encoding process, according to an embodiment.

BEST MODE

Figure 1:
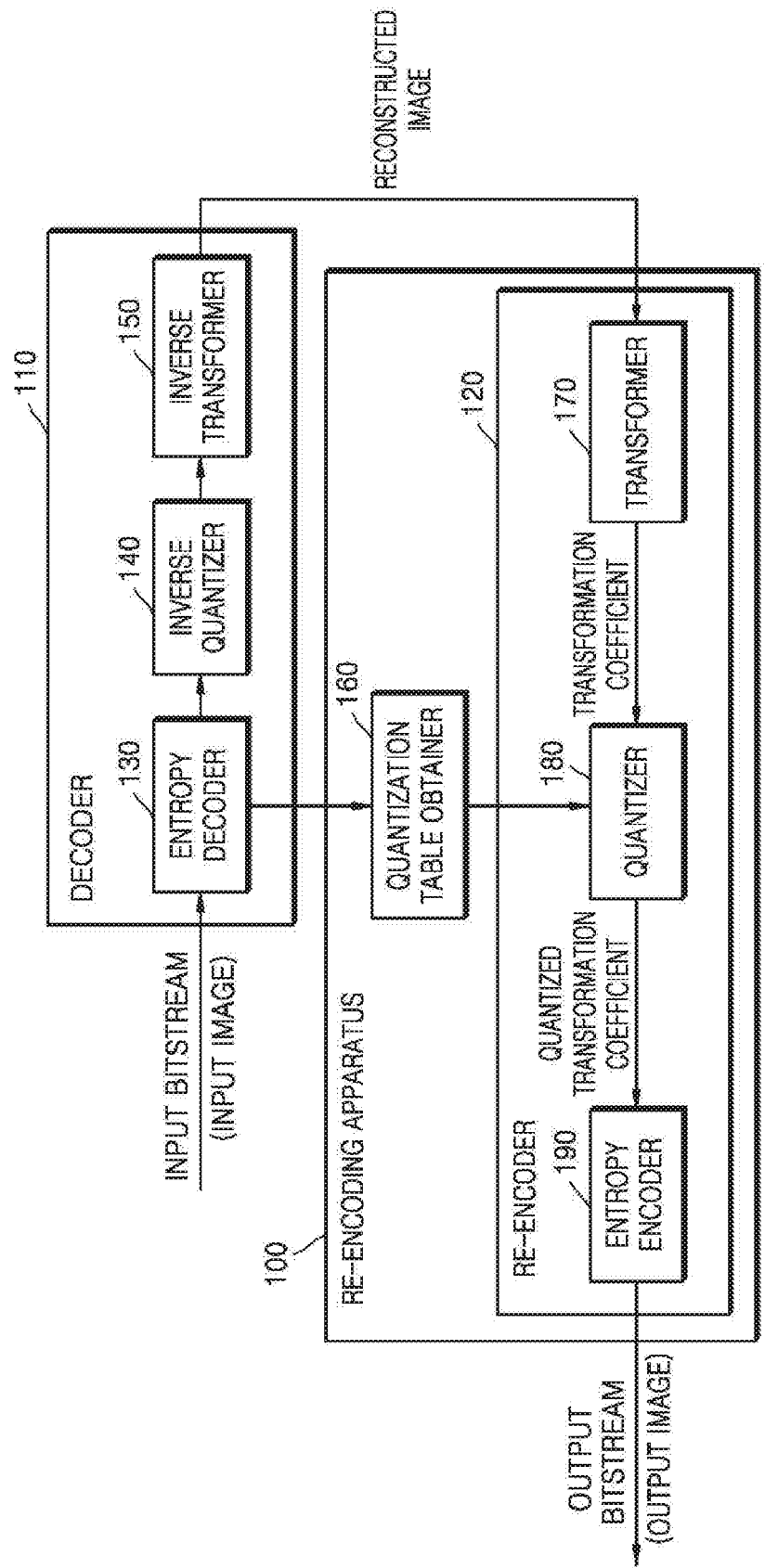
FIG. 1 is a block diagram of a re-encoding apparatus for re-encoding an image by obtaining a quantization table, according to an embodiment.

Provided are a method and apparatus for re-encoding an encoded image to increase the compression efficiency of the encoded image.

According to various embodiments, a re-encoding method includes obtaining a first quantization table from a bitstream including an image encoded using the first quantization table; obtaining a second quantization table based on a pattern representing a size distribution of values of elements of the first quantization table, the second quantization table including elements corresponding to the elements of the first quantization table; and re-encoding a reconstructed image by using the second quantization table, the reconstructed image being obtained by decoding the encoded image by using the first quantization table.

An element of the second quantization table corresponding to an element having a larger value among two elements of the first quantization table may have a value larger than or equal to that of an element of the second quantization table corresponding to the other element having a smaller value among the two elements.

The elements of the second quantization table may have values larger than those of the elements of the first quantization table corresponding to the elements of the second quantization table.

The obtaining of the second quantization table may include obtaining an average luminance value of a region quantized using the first quantization table; and obtaining the second quantization table on the basis of the average luminance value.

An element of the second quantization table to be used to quantize a direct-current (DC) transformation coefficient may have a value larger than that of an element of the first quantization table to be used to quantize the DC transformation coefficient.

The re-encoding method may further include obtaining information regarding a frequency of symbols used to entropy decode the bitstream; and obtaining an entropy table used to perform entropy encoding, based on the frequency of the symbols. The re-encoding of the reconstructed image may include re-encoding the reconstructed image by using the entropy table.

The re-encoding method may further include obtaining a low-resolution image of the image. The obtaining of the information regarding the frequency of the symbols may include predicting the frequency of the symbols on the basis of the low-resolution image; and determining the frequency of the symbols on the basis of the predicted frequency of the symbols.

The low-resolution image may include a thumbnail image.

The obtaining of the low-resolution image may include determining whether the low-resolution image is to be received from the bitstream; and receiving the low-resolution image from the bitstream when it is determined that the low-resolution image is to be received from the bitstream.

When it is determined that the low-resolution image is not to be received from the bitstream, the obtaining of the low-resolution image may further include parsing the bitstream to generate the low-resolution image.

The obtaining of the entropy table may include selecting an entropy table from among a plurality of predetermined entropy tables, based on the frequency of the symbols.

According to various embodiments, a re-encoding apparatus includes a quantization table obtainer configured to obtain a first quantization table from a bitstream including an image encoded using the first quantization table, and obtain a second quantization table based on a pattern representing a size distribution of values of elements of the first quantization table, the second quantization table including elements corresponding to the elements of the first quantization table; and a re-encoder configured to re-encode a reconstructed image by using the second quantization table, the reconstructed image being obtained by decoding the encoded image by using the first quantization table.

An element of the second quantization table corresponding to an element having a larger value among two elements of the first quantization table may have a value larger than or equal to that of an element of the second quantization table corresponding to the other element having a smaller value among the two elements.

The elements of the second quantization table may have values larger than those of the elements of the first quantization table corresponding to the elements of the second quantization table.

The quantization table obtainer may obtain an average luminance value of a region quantized using the first quantization table, and obtain the second quantization table on the basis of the average luminance value.

An element of the second quantization table to be used to quantize a direct-current (DC) transformation coefficient may have a value larger than that of an element of the first quantization table to be used to quantize the DC transformation coefficient.

The re-encoding apparatus may further include an entropy table obtainer configured to obtain information regarding a frequency of symbols used to entropy decode the bitstream, and obtain an entropy table used to perform entropy encoding, based on the frequency of the symbols. The re-encoder may re-encode the reconstructed image by using the entropy table.

The entropy table obtainer may obtain a low-resolution image of the image, predict the frequency of the symbols by using the low-resolution image, and determine the frequency of the symbols by using the predicted frequency of the symbols.

The low-resolution image may include a thumbnail image.

The entropy table obtainer may determine whether the low-resolution image is to be received from the bitstream, and receive the low-resolution image from the bitstream when it is determined that the low-resolution image is to be received from the bitstream.

The entropy table obtainer may parse the bitstream to generate the low-resolution image when the low-resolution image is not to be received from the bitstream.

The entropy table obtainer may select an entropy table from among a plurality of predetermined entropy tables, based on the frequency of the symbols.

According to various embodiments, a computer-readable recording medium having recorded thereon a program for performing a re-encoding method is provided.

According to various embodiments, a program for performing a re-encoding method is provided.

Mode of the Invention

The terminology used herein is for the purpose of describing particular embodiments only and is not intended to be limiting of the present disclosure. As used herein, the singular forms 'a', can and 'the' are intended to include the plural forms as well, unless the context clearly indicates otherwise. It will be further understood that the terms 'comprises' and/or 'comprising,' when used in this specification, specify the presence of stated elements, operations, etc., but do not preclude the presence or addition of one or more other elements, operations, etc.

In various embodiments set forth herein, the term 'video' should be comprehensively understood to include not only a still image but also a moving picture such as video In the present disclosure, the term 'image' should be understood as a still image. When an image to be decoded is an input image, an image reconstructed by decoding an input bitstream is a reconstructed image, and an image re-encoded by a re-encoding apparatus is an output image, the term 'image' should be understood to include all the input image, the reconstructed image, and the output image. For example, the input image or the output image may be an image compressed in the JPEG format.

In the present disclosure, the term 'sample' should be understood as data allocated to a video sampling position, i.e., data to be processed. For example, pixels of video in a space region may be samples. As another example, residual corresponding to pixels of video in a space region may be samples.

In the present disclosure, a block type may be a square or a rectangle or may be a geometric shape, and is not limited to a data unit having a certain size. For example, a block may have a size of 8×8.

In the present disclosure, the term 'signaling' may be understood to mean transmission or reception of a signal. For example, when video data is encoded, signaling may be understood as transmitting an encoded signal. As another example, when video data is decoded, signaling may be understood as receiving an encoded signal.

Methods and apparatuses for re-encoding an image according to various embodiments will be described with reference to FIGS. 1 to 9 below. Furthermore, various embodiments to which the methods described above are applicable will be described with reference to FIGS. 10 and 11.

FIG. 1 is a block diagram of a re-encoding apparatus for re-encoding an image by obtaining a quantization table, according to an embodiment.

As illustrated in FIG. 1, a re-encoding apparatus 100 may include a quantization table obtainer 160 and a re-encoder 120. The re-encoder 120 may include an entropy encoder 190, a quantizer 180, and a transformer 170. However, the re-encoding apparatus 100 may further include other elements or may include only some of the elements illustrated in FIG. 1.

A decoder 110 may include an entropy decoder 130, an inverse quantizer 140, and an inverse transformer 150.

In one embodiment, the decoder 110 may receive a bitstream generated by encoding an image. For example, the decoder 110 may receive an input bitstream generated by encoding an input image.

The entropy decoder 130 parses an input bitstream to obtain encoded video data to be decoded and coding information needed to perform decoding. The encoded video data is a quantized transformation coefficient. The inverse quantizer 140 and the inverse transformer 150 reconstruct the video data from the quantized transformation coefficient. The decoder 110 may reconstruct an image from the input bitstream. The reconstructed video data may be output as a reconstructed image.

In one embodiment, the re-encoder 120 may perform operations to re-encode the image reconstructed by the decoder 110.

In one embodiment, the transformer 170 may output a transformation coefficient generated by transforming the reconstructed image on a block basis to the quantizer 180. For example, the transformer 170 may perform discrete cosine transform (DCT) on the reconstructed image on an 8×8 pixel block basis to obtain a transformation coefficient, and output the transformation coefficient to the quantizer 180.

In one embodiment, the quantizer 180 may quantize the transformation coefficient output from the transformer 170 by using a quantization table, and output the quantized transformation coefficient to the entropy encoder 190.

The quantized transformation coefficient obtained by the transformer 170 and the quantizer 180 may be output as an output bitstream via the entropy encoder 190.

In the process described above, the quantizer 180 according to one embodiment may quantize the transformation coefficient output from the transformer 170 by using a quantization table generated by the quantization table obtainer 160. The quantizer 180 may output the quantized transformation coefficient to the entropy encoder 190.

The quantization table obtainer 160 may obtain the quantization table to be used to quantize the transformation coefficient by the quantizer 180. For example, the quantization table obtainer 160 may generate the quantization table.

The quantization table may be understood as a table to be used in a quantization process or an inverse quantization process.

The quantization table to be used in the quantization process or the inverse quantization process may be transmitted in a bitstream, or may be a basic table stored beforehand in the decoder 110 or the re-encoder 120. For example, a first quantization table used to encode the input bitstream may be transmitted in the input bitstream. Furthermore, the decoder 110 may use the first quantization table obtained from the input bitstream to perform inverse quantization.

Furthermore, the re-encoding apparatus 100 according to an embodiment may quantize the transformation coefficient by using the quantization table obtained by the quantization table obtainer 160. For example, the re-encoding apparatus 100 may quantize the transformation coefficient by using the quantization table generated by the quantization table obtainer 160.

The quantization table obtainer 160 may obtain the first quantization table used to encode an input image by parsing a header of a bitstream generated by encoding the input image.

The quantization process may be performed during the encoding of the input image into the input bitstream. During the encoding of the input image, the first quantization table may be used. The first quantization table may be obtained by entropy decoding the input bitstream. For example, information regarding the first quantization table may be included in the header of the input bitstream. The header of the input bitstream may be entropy decoded to obtain the first quantization table. The obtained first quantization table may be output to the quantization table obtainer 160 from the entropy decoder 130.

In one embodiment, the quantization table obtainer 160 generates a second quantization table from the first quantization table. For example, the quantization table obtainer 160 may generate the second quantization table including elements corresponding to elements of the first quantization table, based on a pattern representing a size distribution of values of the elements of the first quantization table.

The sizes of the first quantization table and the second quantization table may be predetermined. For example, the sizes of the first quantization table and the second quantization table may be predetermined to be 8×8.

In one embodiment, the quantization table obtainer 160 may generate the second quantization table to be used to quantize the transformation coefficient by the quantizer 180. A compression rate when quantization is performed using the second quantization table may be higher than that when quantization is performed using the first quantization table.

As another example, the quantization table obtainer 160 may generate the second quantization table including elements having a pattern similar to the pattern representing the size distribution of the values of the elements of the first quantization table. As another example, the quantization table obtainer 160 may generate the second quantization table such that the difference between a degree of image-quality degradation caused by the second quantization table and a degree of image-quality degradation caused by the first quantization table is within a predetermined range.

In one embodiment, the quantization table obtainer 160 may generate the second quantization table based on the pattern representing the size distribution of the values of the elements of the first quantization table.

For example, a case in which a first element and a second element included in the first quantization table correspond to a third element and a fourth element included in the second quantization table will be described below.

In one embodiment, the quantization table obtainer 160 may set values of the third and fourth elements such that the difference between a value obtained by dividing the value of the first element by the value of the second element and a value obtained by dividing the value of the third element by the value of the fourth element is within a predetermined range with respect to the first element and the second element which are randomly selected. For example, when '10' and '5' which are elements of the first quantization table correspond to 'x' and 'y' which are elements of the second quantization table, 'x' and 'y' may be set to satisfy a condition that a value of x/y is larger than or equal to '1' or smaller than or equal to '3'.

When the first element of the first quantization table corresponds to the third element of the second quantization table, the quantization table obtainer 160 according to an embodiment may set the value of the third element to a value obtained by multiplying the value of the first element by a value which is within the predetermined range. For example, if the predetermined range is greater than or equal to '10' and less than or equal to '15', one of integers from 10 to 15 may be selected as the value of the third element when the value of the first element is '1'. As another example, if the predetermined range is greater than or equal to '3' and less than or equal to '4', the value of the third element may be '6' and the value of the fourth element may be '12' when the value of the first element is '2' and the value of the second element is '3'. As another example, if the predetermined range is greater than or equal to '4' and less than or equal to '6', the value of the third element may be '18' and the value of the fourth element may be '16' when the value of the first element is '3' and the value of the second element is '4'.

Various methods may be used to determine a value to be multiplied to a value of an element of the first quantization table so as to determine the value of an element included in the second quantization table. For example, in order to select a value from a predetermined range, a value may be selected according to a predetermined rule or may be selected randomly, a specific value may be determined, a value may be determined according to location of each element, or a value may be determined according to each element.

An example in which the second quantization table is generated based on the pattern of the values of the elements of the first quantization table will be described with reference to FIG. 3A below. Here, the pattern according to one embodiment may represent a size distribution of the values of the elements. As another example, the pattern may represent a method in which values of the elements vary according to zigzag scan.

In one embodiment, the quantization table obtainer 160 may generate the second quantization table on the basis of a luminance value of a region quantized using the first quantization table.

For example, the quantization table obtainer 160 may obtain an average luminance value of the region quantized using the first quantization table and generate the second quantization table on the basis of the average luminance value.

A case in which a first block included in a reconstructed image is quantized using the second quantization table by the re-encoder 120 according to an embodiment will be described below.

For example, an average element value which is an average of the values of the elements included in the second quantization table may be determined based on an average luminance value which is an average of luminance values of samples included in the first block. The quantization table obtainer 160 may set the values of the elements of the second quantization table such that an average element value when the average luminance value is smaller than a specific value is smaller than that when the average luminance value is larger than the specific value.

If the average of the values of the elements of the second quantization table is determined to be proportional to the average luminance value, a degree of image-quality degradation when an image having a small average luminance value is re-encoded may be lower than that when an image having a large average luminance value is re-encoded.

A method of setting values of elements of a quantization table to be proportional to a luminance value may be appropriate for re-encoding an image in which a degree of image-quality degradation when a screen is dark is higher than that when the screen is light.

As another example, the quantization table obtainer 160 may set the values of the elements of the second quantization table such that an average element value when the average luminance value is smaller than a specific value is larger than that when the average luminance value is larger than the specific value.

If an average of the values of the elements of the second quantization table is determined to be inversely proportional to the average luminance value, a degree of image-quality degradation when an image having a small average luminance value is re-encoded may be higher than that when an image having a large average luminance value is re-encoded.

A method of setting values of elements of a quantization table to be inversely proportional to a luminance value may be appropriate for re-encoding an image in which a degree of image-quality degradation when a screen is dark is lower than that when the screen is light.

In one embodiment, the quantization table obtainer 160 may determine a value of a fifth element of the second quantization table on the basis of a luminance value of a sample quantized using the fifth element. For example, the quantization table obtainer 160 may set the value of the fifth element to be proportional to the luminance value of the sample quantized using the fifth element. As another example, the quantization table obtainer 160 may use the luminance value of the sample quantized using the fifth element as a value to be used to set the value of the fifth element. The values of the elements of the second quantization table may be larger than those of the elements of the first quantization table corresponding to the elements of the second quantization table.

For example, an element of the second quantization table used to quantize a direct-current (DC) transformation coefficient may have a larger value than a value of an element of the first quantization table used to quantize the DC transformation coefficient. In one embodiment, the DC transformation coefficient may be understood as a transformation coefficient of a DC component among transformation coefficients to be quantized.

As another example, when an element of the first quantization table corresponding to a DC component has a value of 17, an element of the second quantization table corresponding to the DC component may have a value larger than '17'. As another example, when an element at a (1,3) position on an 8×8 first quantization table has a value of 31, an element at a (1,3) position on the second quantization table may have a value larger than '31'.

Since the values of the elements of the second quantization table are larger than those of the elements of the first quantization table, a degree of image-quality degradation when quantization is performed using the second quantization table may be higher than that when quantization is performed using the first quantization table.

Since the values of the elements of the second quantization table are larger than those of the elements of the first quantization table, a compression rate when quantization is performed using the second quantization table may be higher than that when quantization is performed using the first quantization table. For example, since a quantized transformation coefficient may be a quotient obtained by dividing each transformation coefficient by an element of the second quantization table corresponding to a position of the transformation coefficient, a compression rate may be increased as values of elements of a quantization table are increased.

An embodiment in which the quantization table obtainer 160 generates the second quantization table from the first quantization table will be described in detail with reference to FIG. 3A below.

In one embodiment, the quantization table obtainer 160 may generate the second quantization table to include elements having a pattern similar to a pattern representing a size distribution of the elements of the first quantization table.

For example, a value of an element of the second quantization table corresponding to an element having a larger value among two elements of the first quantization table may be larger than or equal to that of an element of the second quantization table corresponding to the other element having a smaller value among the two elements.

As another example, a value of an element of the second quantization table corresponding to an element having a larger value among two elements included in the first quantization table and have having different values may be larger than or equal to that of an element of the second quantization table corresponding to the other element having a smaller value among the two elements.

As another example, a case in which there are a first element and a second element which are two random elements included in the first quantization table and having different values will be described below. When the first element has a value larger than that of the second element, a third element of the second quantization table corresponding to the first element may be greater than or equal to a fourth element of the second quantization table corresponding to the second element. The sizes of the first quantization table and the second quantization table may be the same. A position of the first element in the first quantization table may be the same as that of the third element in the second quantization table. For example, when the position of the first element in the first quantization table is (0,0), the position of the third element in the second quantization table may be (0,0).

As another example, when a fifth element and a sixth element which are two random elements included in the first quantization table and having the same value respectively correspond to a seventh element and an eighth element of the second quantization table, the seventh element may be greater than the eighth element. Alternatively, the seventh element may have the same value as the eighth element.

As another example, a ninth element which is a random element included in the first quantization table corresponds to a tenth element included in the second quantization table, the tenth element may have a value obtained by adding a predetermined value to a value of the ninth element. For example, the elements of the second quantization table may be equal to values obtained by adding '3' to all the elements included in the first quantization table.

As another example, when the ninth element which is a random element included in the first quantization table corresponds to the tenth element of the second quantization table, the tenth element may have a value obtained by multiplying the value of the ninth element by a value and adding a value to a resultant value. For example, the second quantization table may include elements having values obtained by multiplying all the elements of the first quantization table by '5' and adding '7' to resultant values.

Since the elements of the second quantization table have a pattern similar to the pattern representing the size distribution of the elements of the first quantization table, the difference between a peak signal-to-noise ratio (PSNR) when the quantizer 180 performs quantization using the first quantization table and a PSNR when the quantizer 180 performs quantization using the second quantization table may be restricted to be in a predetermined range.

An embodiment in which the quantization table obtainer 160 generates the second quantization table from the first quantization table will be described with reference to FIG. 3A below.

In one embodiment, the decoder 110 may decode a reconstructed image from a bitstream by using the first quantization table. The re-encoder 120 may re-encode the reconstructed image, which is obtained by decoding the bitstream, by using the second quantization table.

In detail, the quantizer 180 included in the re-encoder 120 may generate a quantized transformation coefficient by quantizing a transformation coefficient by using the second quantization table generated by the quantization table obtainer 160. The quantizer 180 may output the quantized transformation coefficient to the entropy encoder 190.

The entropy encoder 190 may perform entropy encoding on the basis of values calculated by the quantizer 180, coding parameters calculated in an encoding process, or the like, and output an output bitstream. For example, the entropy encoder 190 may perform entropy encoding by receiving the quantized transformation coefficient from the quantizer 180.

When entropy encoding is performed, a small number of bits may be allocated to a symbol of high frequency and a large number of bits may be allocated to a symbol of low frequency. Thus, in this case, a bitstream including bit strings representing symbols may be shorter than when a bit string is randomly allocated to each of the symbols. Thus, compression performance of video encoding may be increased by performing entropy encoding. In one embodiment, for entropy encoding, the entropy encoder 190 may use a variable length coding (VLC) method.

In one embodiment, the entropy encoder 190 may perform entropy encoding using an entropy table corresponding to an input bitstream, as will be described in detail with reference to FIGS. 4 to 8 below.

Figure 2:
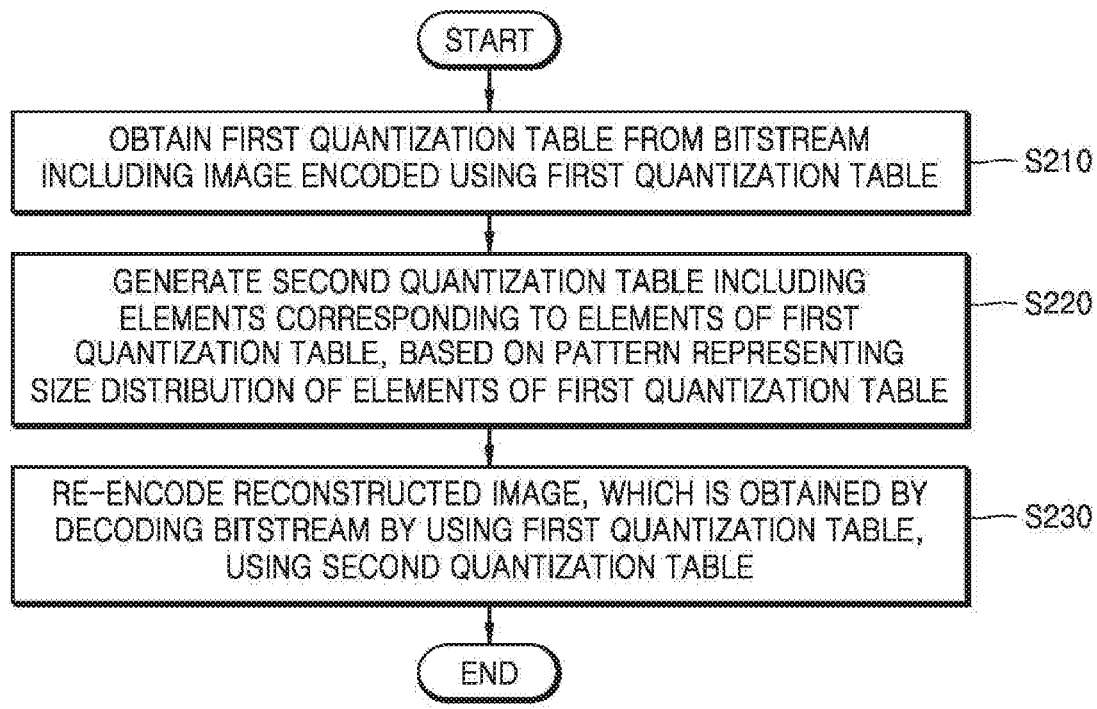
FIG. 2 is a flowchart of a method of re-encoding a reconstructed image by obtaining a quantization table, performed by a re-encoding apparatus, according to an embodiment.

FIG. 2 is a flowchart of operations performed by the re-encoding apparatus 100 of FIG. 1. In detail, FIG. 2 illustrates a flowchart of a method of re-encoding a reconstructed image by generating a quantization table, performed by a re-encoding apparatus, according to an embodiment.

In operation S210, the re-encoding apparatus obtains a first quantization table used to encode an input image by parsing a header of an input bitstream generated by encoding the input image.

The first quantization table may be used during the encoding of the input image into the input bitstream. Information regarding the first quantization table may be transmitted in the input bitstream. For example, the re-encoding apparatus may obtain the first quantization table by parsing the header of the input bitstream.

In one embodiment, the re-encoding apparatus may obtain the first quantization table by using an entropy decoder.

In operation S220, the re-encoding apparatus generates a second quantization table including elements corresponding to elements included in the first quantization table obtained in operation S210.

In one embodiment, the re-encoding apparatus may generate the second quantization table based on a pattern representing a size distribution of values of the elements of the first quantization table.

In another embodiment, the re-encoding apparatus may generate the second quantization table on the basis of an average luminance value of a region quantized using the first quantization table.

The re-encoding apparatus may generate the second quantization table from the first quantization table. An embodiment in which the re-encoding apparatus generates the second quantization table from the first quantization table will be described in detail with reference to FIG. 3A below.

In operation S230, the re-encoding apparatus re-encodes a reconstructed image, which is obtained by decoding the input bitstream, using the second quantization table generated by the re-encoding apparatus. Here, the reconstructed image may be obtained by decoding the input image encoded in the form of the input bitstream by using the first quantization table, performed by the decoder 110.

The re-encoding apparatus may generate a transformation coefficient quantized using the second quantization table generated by the re-encoding apparatus. The re-encoding apparatus may generate an output bitstream by performing entropy encoding on the quantized transformation coefficient, etc., and output the output bitstream.

In one embodiment, the re-encoding apparatus may perform entropy encoding using an entropy table corresponding to the input bitstream, as will be described in detail with reference to FIGS. 4 to 8 below.

FIG. 3A to 3E are diagrams illustrating a method of obtaining a quantization table to be used in a re-encoding process, according to an embodiment.

FIG. 3A illustrates one example of a first quantization table used to encode an input image into an input bitstream. As illustrated in FIG. 3A, values of elements included in the first quantization table according to an embodiment may increase from an upper left side to a lower right side.

FIG. 3B illustrates a table normalized from the first quantization table of FIG. 3A.

Normalization should be understood as converting data according to a predetermined rule. In one embodiment, normalization may be a process of structuring data to minimize redundancy between the data. For example, when a plurality of values may be expressed as multiples of a specific value within a predetermined error range, expressing multiples of the specific value to which the plurality of values respectively correspond may be an example of normalization. For example, since the elements of FIG. 3A may be expressed as multiples of '30' within the predetermined error range, FIG. 3B illustrates a table showing the multiples of '30' to which the values of the elements of FIG. 3A correspond.

For example, values of a first-1 element 311 to a first-4 element 314 of FIG. 3A are larger than or equal to '30' and equal to or smaller than '33' and thus correspond to a value of '30' multiplied by '1'. Thus, the re-encoding apparatus may determine values of a second-1 element 321 to a second-4 element 324 corresponding to the first-1 element 311 to the first-4 element 314 to be '1'.

As another example, a value of a first-5 element 315 of FIG. 3A is '62' and is thus twice '30'. Thus, the re-encoding apparatus may determine a value of a second-5 element 325 corresponding to the first-5 element 315 to be '2'.

FIG. 3C illustrates a table obtained by multiplying the normalized table of FIG. 3B by a certain value. In detail, FIG. 3C illustrates a table including, as elements, values obtained by multiplying each of elements of the normalized table of FIG. 3B by '50'. The table of FIG. 3C is one embodiment of the second quantization table generated using the first quantization table of FIG. 3A by the quantization table obtainer 160.

A value to be multiplied to a normalized value may be determined in consideration of a compression rate. As values of a quantization table are increased, a compression rate may be increased. Thus, the quantization table obtainer 160 may determine a value to be multiplied to the normalized table by taking into account a target compression rate to be obtained through re-encoding. In FIG. 3C, the quantization table obtainer 160 generates a quantization table by multiplying each value of the normalized table by '50'. Here, '50' which is a value multiplied to each value of the normalized table is larger than '30' which is a reference value for the normalization. A compression rate is high when the value multiplied to each value of the normalized table is larger than the reference value for the normalization of the table. Thus, in one embodiment, the reference value for the normalization of the table may be larger than or equal to the value multiplied to each value of the normalized table.

The elements of the second quantization table may have values larger than those of elements of the first quantization table corresponding to the positions of the elements of the second quantization table. For example, with respect to an upper left side of each of the first and second quantization tables as a reference point, a value of 50 at a position (1,1) on a third-1 element 331 is larger than a value of 32 of the first-1 element 311 at a position (1,1) on the first quantization table. As another example, with respect to the upper left side of each of the first and second quantization tables as a reference point, a value of 400 at a position (8,8) on a third-6 element 336 of the second quantization table is larger than a value of 242 on a position on a first-6 element 316 of the first quantization table.

Thus, a compression rate when quantization is performed using the second quantization table of FIG. 3C may be higher than that when quantization is performed using the first quantization table of FIG. 3A. For example, a quantized transformation coefficient may be a quotient obtained by dividing each transformation coefficient by a value of an element of the second quantization table corresponding to a position of the transformation coefficient. Thus, as values of elements included in a quantization table are increased, a compression rate may be increased.

Furthermore, a PSNR when quantization is performed using the first quantization table of FIG. 3A and a PSNR when quantization is performed using the second quantization table of FIG. 3C may be restricted to be in a predetermined range. This is because a pattern representing a size distribution of the elements of the first quantization table and a pattern representing a size distribution of the elements of the second quantization table are similar to each other.

FIG. 3D illustrates a second quantization table generated by multiplying the normalized table of FIG. 3B by a certain value. In detail, FIG. 3D illustrates a table including, as elements, values obtained by multiplying the values of the elements of the normalized table of FIG. 3B by the value.

When the values of the elements of the normalized table of FIG. 3B are multiplied to the value, the value may be determined on the basis of a predetermined method. In one embodiment, the predetermined method may include a method considering a sense of sight of a human being. For example, when the second quantization table is obtained by multiplying the values of the elements of the normalized table by a value, a value to be multiplied to the value of an element of high frequency may be set to be larger than that to be multiplied to the value of an element of low frequency. As another example, when the second quantization table is obtained by multiplying the elements of the normalized table by values, the re-encoding apparatus may determine values to be respectively multiplied to each of the elements such that loss of information regarding a portion which is sensitive to the sense of sight of a human being is decreased. In one embodiment, the re-encoding apparatus may set an offset for a value to be multiplied by the values of the elements of the table of FIG. 3B.

For example, a value of a fourth-1 element 341 may be determined to be a product of the second-1 element 321 and '48'. As another example, a value of a fourth-2 element 342 may be determined to be a product of the second-2 element 322 and '49'. As another example, a value of a fourth-3 element 343 may be determined to be a product of the second-3 element 323 and '50', As another example, a value of a fourth-4 element 344 may be determined to be a product of the second-4 element 324 and '54'. As another example, a value of a fourth-5 element 345 may be determined to be a product of the second-5 element 325 and '55'. As another example, a value of a fourth-6 element 346 may be determined to be a product of a second-6 element 326 and '56'.

In one embodiment, when it is determined that the sense of sight of a human being is more sensitive to the value of the fourth-1 element 341 than the value of the fourth-3 element 343, the re-encoding apparatus may set a value to be multiplied to the second-3 element 323 to be smaller than a value to be multiplied to the second-1 element 321.

Various methods may be used to determine a degree to which a sense of sight of a human being is influenced by a value of each element. For example, methods of determining a degree to which a sense of sight of a human being is influenced by each element may include a human visual system (HVS).

FIG. 3E illustrates a second quantization table generated by adjusting some of the elements of the table of FIG. 3C.

In one embodiment, the re-encoding apparatus may obtain a second quantization table by adjusting the values of the elements of the table (FIG. 3C) which are obtained by multiplying the elements of the table including normalized values (FIG. 3B) by a certain value. In one embodiment, the re-encoding apparatus may obtain the values of the elements of the second quantization table by taking into account a degree to which a sense of sight of a human being is sensitive to each of the values of the elements.

For example, a value of a fifth-1 element 351 may be determined to be a result of subtracting '10' from the value of the third-1 element 331. As another example, a value of a fifth-2 element 352 may be determined to be a result of subtracting '10' from a value of a third-2 element 332. As another example, a value of a fifth-3 element 353 may be determined to be a result of subtracting '5' from a value of a third-3 element 333. As another example, a value of a fifth-4 element 354 may be determined to be a result of adding '5' to a value of a third-4 element 334. As another example, a value of a fifth-5 element 355 may be determined to be a result of adding '20' to a value of a third-5 element 335. As another example, a value of a fifth-6 element 356 may be determined to be a result of adding '30' to a value of a third-6 element 336.

Various methods may be used to determine a degree to which a sense of sight of a human being is influenced by the value of each of the elements. For example, methods of determining a degree to which a sense of sight of a human being is influenced by each element may include the human visual system (HVS).

Figure 4:
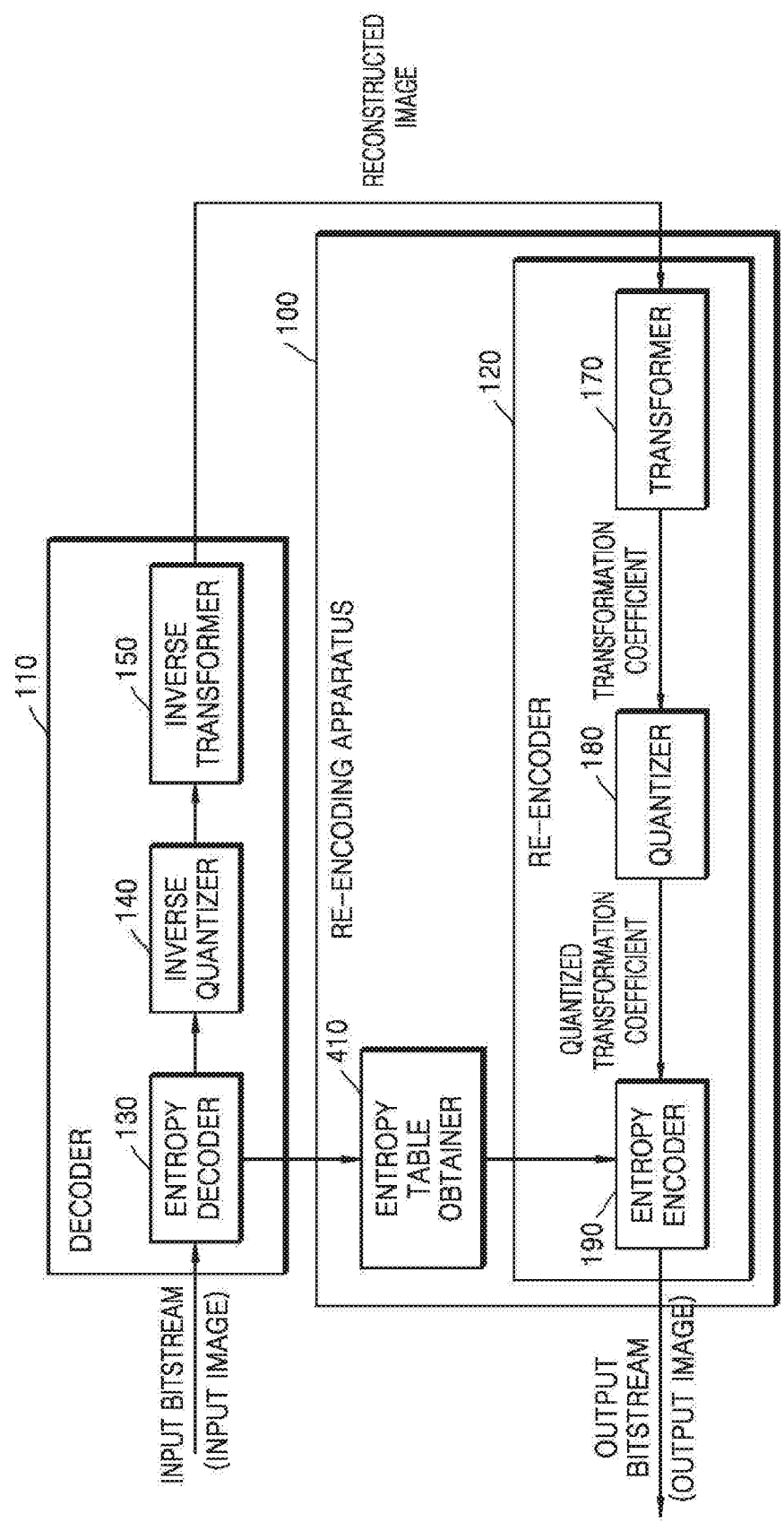
FIG. 4 is a block diagram of a re-encoding apparatus which re-encodes an image by obtaining an entropy table, according to another embodiment.

FIG. 4 is a block diagram of a re-encoding apparatus which re-encodes an image by generating an entropy table, according to another embodiment.

As illustrated in FIG. 4, a re-encoding apparatus 100 may include an entropy table obtainer 410 and a re-encoder 120. The re-encoder 120 may include an entropy encoder 190, a quantizer 180, and a transformer 170. However, the re-encoding apparatus 100 may further include other elements or may include only some of the elements illustrated in FIG. 4.

A decoder 110 may include an entropy decoder 130, an inverse quantizer 140, and an inverse transformer 150.

Referring to FIG. 4, the re-encoding apparatus 100 according to one embodiment includes some of the elements illustrated in FIG. 1. Thus, although not described below, the above description of the re-encoding apparatus 100 with reference to FIGS. 1 to 3 is also applicable to the re-encoding apparatus 100 of FIG. 4.

In one embodiment, the decoder 110 may receive an input bitstream generated by encoding an input image.

The entropy decoder 130 parses the input bitstream to obtain encoded video data to be decoded and coding information needed for performing decoding. The encoded video data is a quantized transformation coefficient and thus the inverse quantizer 140 and the inverse transformer 150 reconstruct video data from the quantized transformation coefficient. The decoder 110 may reconstruct an image from the input bitstream. The reconstructed video data may be output as the reconstructed image.

In one embodiment, the re-encoder 120 may perform operations to re-encode the image reconstructed by the decoder 110.

In one embodiment, the transformer 170 may output a transformation coefficient obtained by transforming the reconstructed image on a block basis to the quantizer 180. For example, the transformer 170 may perform discrete cosine transform on the reconstructed image on an 8×8 pixel block basis to obtain a transformation coefficient, and output the transformation coefficient to the quantizer 180.

In one embodiment, the quantizer 180 may quantize the transformation coefficient output from the transformer 170 by using a quantization table, and output the quantized transformation coefficient to the entropy encoder 190.

The quantized transformation coefficient obtained by the transformer 170 and the quantizer 180 may be output as an output bitstream via the entropy encoder 190.

In the process described above, the entropy encoder 190 according to an embodiment may entropy encode the quantized transformation coefficient by using an entropy table generated by the entropy table obtainer 410. In one embodiment, the entropy encoder 190 may entropy encode the quantized transformation coefficient and output an output bitstream.

The entropy encoder 190 may output the output bitstream by performing entropy encoding on the basis of values calculated by the quantizer 180, a coding parameter calculated in an encoding process, or the like. For example, the entropy encoder 190 may perform entropy encoding by receiving the quantized transformation coefficient from the quantizer 180.

In one embodiment, the entropy encoder 190 may perform entropy encoding using the generated entropy table.

For example, the entropy encoder 190 may perform entropy encoding using the entropy table generated adaptively to the input bitstream by the entropy table obtainer 410.

The entropy table obtainer 410 may generate an entropy table to be used to re-encode the image reconstructed from the input bitstream.

In one embodiment, the entropy table obtainer 410 may obtain information regarding the frequency of symbols used to entropy decode the input bitstream.

In one embodiment, the entropy decoder 130 may parse symbols, such as the coding information, the transformation coefficient, etc., by entropy encoding the received input bitstream.

In one embodiment, the entropy table obtainer 410 may obtain information regarding the frequency of the symbols entropy encoded by the entropy decoder 130.

In another embodiment, the entropy table obtainer 410 may obtain information regarding the frequency of symbols entropy decoded during decoding of the input image from the input bitstream.

For example, the entropy decoder 130 may obtain information regarding the frequency of various symbols related to the input bitstream during parsing of the various symbols by entropy decoding the received input bitstream. The entropy table obtainer 410 may obtain information regarding the frequency of each symbol of the input bitstream from the entropy decoder 130.

In one embodiment, the entropy table obtainer 410 may generate an entropy table, based on the frequency of the symbols entropy decoded during the decoding of the input image. In this case, the entropy table may be used to match a bit string to each of symbols entropy encoded using the frequency of the entropy decoded symbols.

In one embodiment, the entropy table may be used to match a bit string to each of symbols entropy encoded during encoding or re-encoding of an image. In this case, in one embodiment, the entropy table obtainer 410 may generate the entropy table by using the frequency of the symbols to be entropy encoded.

In one embodiment, the entropy table obtainer 410 may determine the length of a bit string corresponding to a symbol to be entropy encoded on the basis of the frequency of the symbol corresponding to the bit string. For example, the entropy table obtainer 410 may generate an entropy table by using the frequency of symbols such that the length of a bit string corresponding to a first symbol among symbols to be entropy encoded is shorter than or equal to that of a bit string corresponding to a second symbol which occurs less frequently than the first symbol.

In one embodiment, the entropy table obtainer 410 generates the entropy table on the basis of the frequency of each of the symbols related to the input bitstream and may thus generate the entropy table adaptively to the input image or the reconstructed image. Thus, in one embodiment, the entropy table obtainer 410 may generate an entropy table corresponding to the input image or the reconstructed image.

In another embodiment, the entropy table obtainer 410 may select one of a plurality of entropy tables set beforehand on the basis of the frequency of the symbols entropy decoded during the decoding of the input image.

For example, the entropy table obtainer 410 may store a plurality of entropy tables according to expected features of an image to be re-encoded. For example, the entropy table obtainer 410 may store an entropy table for efficiently re-encoding an image, such as a seascape, in which a degree of change in values of samples is not generally high. As another example, the entropy table obtainer 410 may store an entropy table for efficiently re-encoding an image, such as a townscape, in which a degree of change in values of samples is relatively high.

In one embodiment, the entropy table obtainer 410 may determine an entropy table among a plurality of entropy tables stored beforehand on the basis of the frequency of symbols entropy decoded by the entropy decoder 130, and output the determined entropy table to the entropy encoder 190.

For example, the entropy table obtainer 410 may obtain a histogram of the frequency of symbols entropy decoded by the entropy decoder 130, and output to the entropy encoder 190 an entropy table most similar to the histogram of the frequency of the symbols among a plurality of entropy tables stored beforehand.

The re-encoder 120 may re-encode the reconstructed image by using the entropy table generated by the entropy table obtainer 410. For example, the entropy encoder 190 may entropy encode the quantized transformation coefficient received from the quantizer 180 by using the entropy table generated by the entropy table obtainer 410.

The quantizer 180 included in the re-encoder 120 may generate the quantized transformation coefficient by quantizing the transformation coefficient received from the transformer 170. The quantizer 180 may output the generated quantized transformation coefficient to the entropy encoder 190.

The entropy encoder 190 may perform entropy encoding on the basis of values calculated by the quantizer 180, a coding parameter calculated in an encoding process, or the like, and output an output bitstream. For example, the entropy encoder 190 may perform entropy encoding by receiving the quantized transformation coefficient from the quantizer 180.

When entropy encoding is applied, symbols may be expressed by allocating a small number of bits to a symbol of high frequency and a large number of bits to a symbol of low frequency, thereby reducing the size of bit strings of symbols to be encoded. Thus, compression performance of video coding may be increased through entropy encoding. For example, the entropy encoder 190 may employ a coding method such as variable-length coding (VLC) for entropy encoding.

The entropy encoder 190 may use an entropy table to perform entropy encoding.

The entropy table may be understood as a table to be used to perform entropy encoding or entropy decoding.

For example, the entropy encoder 190 may map a quantized coefficient to a symbol by using a first entropy table. Here, the symbol may be a type of an index. Furthermore, the entropy encoder 190 may map a symbol to a codeword by using a second entropy table. Furthermore, the entropy encoder 190 may generate a bitstream representing a codeword by using a third entropy table.

As another example, the entropy encoder 190 may map a quantized coefficient to a codeword by using an entropy table.

As another example, the entropy encoder 190 may map a quantized coefficient to a codeword and code length by using the entropy table.

As another example, the entropy encoder 190 may map a symbol representing a quantized coefficient to a codeword by using the entropy table.

As another example, the entropy encoder 190 may map a symbol representing a quantized coefficient to a codeword and code length by using the entropy table.

As another example, the entropy encoder 190 may generate a bitstream representing a quantized coefficient by using the entropy table.

In one embodiment, the entropy table may be understood as a table to be used to perform entropy encoding. For example, the entropy table may be understood as a table for matching a bit string to each of symbols entropy encoded during encoding or re-encoding of an image. As another example, the entropy table may match a bit string to each of symbols entropy encoded during re-encoding of a reconstructed image. As another example, the entropy table may include a Huffman table.

As another example, the entropy table may include a codeword table for mapping a codeword to each of symbols. As another example, the entropy table may include a table to be used to match each codeword and a bitstream to each other.

In one embodiment, the entropy encoder 190 may match bit strings to symbols generated through quantization and various symbols by using the entropy table. For example, when the frequency of a symbol "101000101" is highest, the entropy table may match a bits string '0' to "101000101". Nine bits are needed to express "101000101" when the entropy table is not provided, but "101000101" may be expressed using only one bit when the entropy table is used. As another example, when the frequency of a symbol "10101" is lowest, the entropy table may match a longest bit string among bit strings to the symbol "10101". As a result of allocating a bit string which may be expressed only with a small number of bits to a symbol of high frequency, a long bit string may be matched to a symbol of low frequency.

In another embodiment, the entropy encoder 190 may match a bit string to each of quantized transformation coefficients generated through quantization by using the entropy table. For example, when the frequency of a quantized transformation coefficient "11100" is highest, the entropy table may match a bit string '0' to "11100". Five bits are needed to express "11100" when the entropy table is not provided but "11100" may be expressed with only one bit when the entropy table is used.

In another embodiment, the entropy encoder 190 may generate a bitstream by using bit strings corresponding to various symbols. For example, the entropy encoder 190 may generate a bitstream in which bit strings are mapped to various symbols are mapped by using the entropy table.

For example, when four codewords '0000', '001', '010', and '011' respectively correspond to symbols 'f', 'a', 'c', and 'e', the entropy encoder 190 may generate a bitstream '0000001010011' representing four consecutive symbols 'f', 'a', 'c', and 'e' by using one or more entropy tables.

As another example, the entropy encoder 190 may generate a bitstream including not only a codeword but also information regarding code length by using the entropy table.

An entropy table used to perform entropy encoding by the re-encoder 120 may be used to decode an output image by another device. Thus, decoding may be performed at a later time using a method of performing encoding by the entropy encoder 190.

The entropy encoder 190 may entropy encode symbols generated through quantization and various symbols by using an entropy table received from the entropy table obtainer 410. The entropy table received from the entropy table obtainer 410 is generated adaptively to an input bitstream and thus the entropy encoder 190 may perform entropy encoding adaptively to a reconstructed image.

Figure 5:
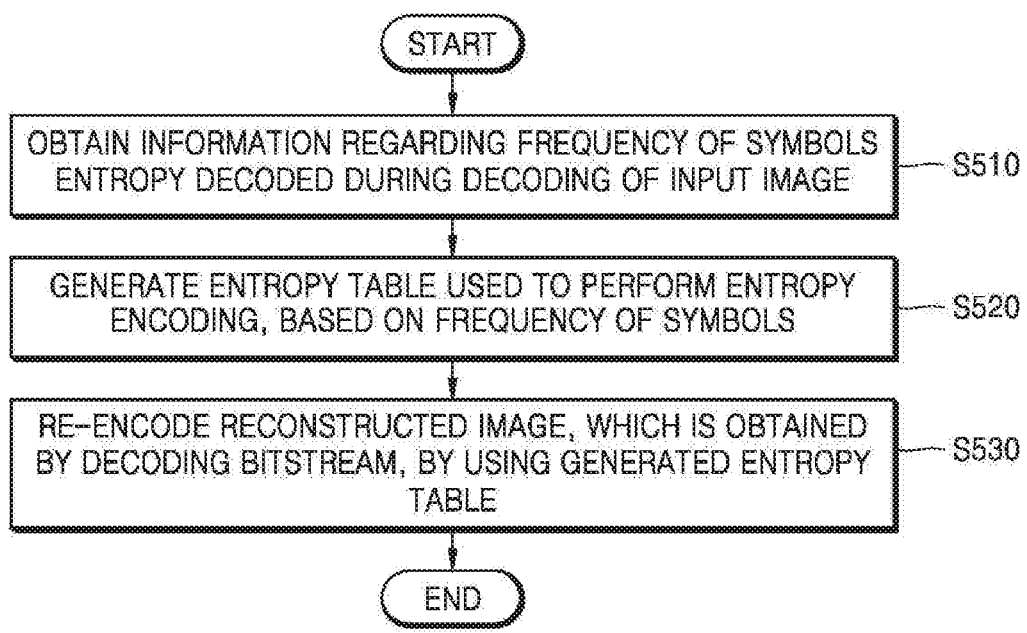
FIG. 5 is a flowchart of a method of re-encoding a reconstructed image by obtaining an entropy table, performed by a re-encoding apparatus, according to another embodiment.

FIG. 5 is a flowchart of operations performed by the re-encoding apparatus 100 of FIG. 4, according to another embodiment. In detail, FIG. 5 is a flowchart of a method of re-encoding a reconstructed image by generating an entropy table, performed by a re-encoding apparatus, according to another embodiment.

In operation S510, a re-encoding apparatus may obtain information regarding the frequency of symbols entropy decoded during decoding of an input image.

For example, the re-encoding apparatus may obtain the information regarding the frequency of the symbols entropy decoded during the decoding of the input image by the entropy decoder 130. In one embodiment, the entropy decoder 130 may perform entropy decoding a received input bitstream to parse symbols such as coding information, a transformation coefficient, etc. In one embodiment, the entropy decoder 130 may obtain information regarding the frequency of the symbols entropy decoded during the parsing of the symbols. In one embodiment, the entropy decoder 130 may output the information regarding the frequency of the symbols to the re-encoding apparatus. The re-encoding apparatus may obtain the information regarding the frequency of the symbols from the entropy decoder 130.

A method of obtaining information regarding the frequency of symbols has been described above in detail with reference to FIG. 4.

In operation S520, the re-encoding apparatus generates an entropy table, based on the information regarding the frequency of the symbols which is obtained in operation S510. Here, the entropy table may be used to match a bit string to each of symbols entropy encoded during re-encoding of an image reconstructed by the decoder 110 by the re-encoding apparatus.

In one embodiment, the entropy table may be used to match a bit string to each of symbol entropy encoded during encoding or re-encoding of an image. In this case, the re-encoding apparatus according to an embodiment may generate the entropy table by using the frequency of symbols to be entropy encoded.

In one embodiment, the re-encoding apparatus may determine the length of the bit string corresponding to each of the symbols to be entropy encoded on the basis of the frequency of the symbol corresponding to the bit string. For example, the re-encoding apparatus may generate the entropy table such that the length of a bit string corresponding to a first symbol is shorter than or equal to that of a bit string corresponding to a second symbol of lower frequency than the frequency of the first symbol among symbols entropy encoded during re-encoding of a reconstructed image.

In one embodiment, the re-encoding apparatus generates the entropy table on the basis of the frequency of each of symbols related to an input bitstream and may thus generate the entropy table adaptively to the input image or the reconstructed image. Thus, the re-encoding apparatus according to an embodiment may generate the entropy table corresponding to the input image or the reconstructed image.

A method of generating the entropy table by using the information regarding the frequency of the symbols obtained in operation S510 has been described above with reference to FIG. 4.

In operation S530, the re-encoding apparatus may re-encode the reconstructed image by using the entropy table generated in operation S520. For example, the re-encoding apparatus may entropy encode a quantized transformation coefficient by using an entropy table generated by the entropy table obtainer 410.

The re-encoding apparatus may generate the quantized transformation coefficient by quantizing a transformation coefficient.

The re-encoding apparatus may output an output bitstream by performing entropy encoding on the basis of quantized values, a coding parameter calculated in an encoding process, or the like. For example, the re-encoding apparatus may perform entropy encoding using the quantized transformation coefficient.

The re-encoding apparatus may perform entropy encoding by using an entropy table generated by the re-encoding apparatus during entropy encoding of symbols generated through quantization and various symbols. The entropy table generated by the re-encoding apparatus is generated adaptively to an input bitstream. Thus, the re-encoding apparatus may perform entropy encoding adaptively to the reconstructed image.

A method of performing entropy encoding has been described above in detail with reference to FIG. 4.

Figure 6:
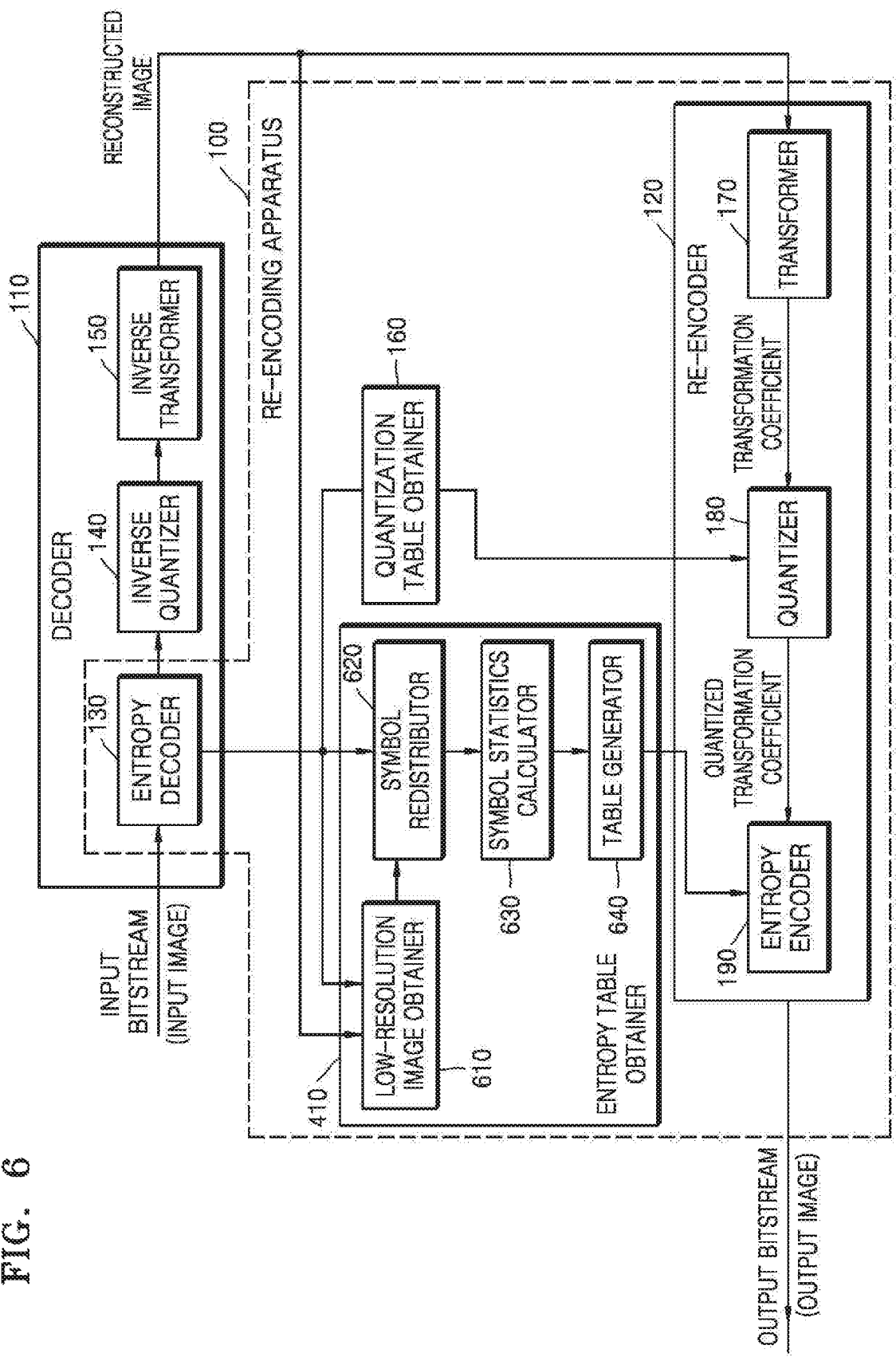
FIG. 6 is a block diagram of a re-encoding apparatus which re-encodes a reconstructed image by obtaining a quantization table and an entropy table, according to another embodiment.

FIG. 6 is a block diagram of a re-encoding apparatus which re-encodes a reconstructed image by generating a quantization table and an entropy table, according to another embodiment.

In one embodiment, a decoder 110 may receive an input bitstream generated by encoding an input image.

An entropy decoder 130 parses the input bitstream to obtain encoded video data to be decoded and coding information needed to perform decoding. The encoded video data is a quantized transformation coefficient. An inverse quantizer 140 and an inverse transformer 150 reconstruct video data from the quantized transformation coefficient. The decoder 110 may reconstruct an image from the input bitstream. The reconstructed video data may be output as the reconstructed image.

In one embodiment, a re-encoder 120 may perform operations to re-encode the image reconstructed by the decoder 110.

In one embodiment, a transformer 170 may output a transformation coefficient generated by transforming the reconstructed image on a block basis to a quantizer 180. For example, the transformer 170 may perform discrete cosine transform on the reconstructed image on an 8×8 pixel block basis to obtain a transformation coefficient, and output the transformation coefficient to the quantizer 180.

In one embodiment, the quantizer 180 may quantize the transformation coefficient output from the transformer 170 by using a quantization table, and output the quantized transformation coefficient to the entropy encoder 190.

The quantized transformation coefficient obtained by the transformer 170 and the quantizer 180 may be output in an output bitstream via the entropy encoder 190.

A quantization table obtainer 160 may generate a quantization table to be used to quantize the transformation coefficient by the quantizer 180 included in the re-encoding apparatus 100. Operations of the quantization table obtainer 160 are as described above in detail with reference to FIGS. 1 to 3.

The entropy decoder 130 may be included in the re-encoding apparatus 100 as illustrated in FIG. 6. The entropy decoder 130 may receive the input bitstream. In one embodiment, the entropy decoder 130 may parse the input bitstream to obtain either a quantization table used to encode a low-resolution image and the input image or symbols obtained during performing of entropy decoding. Operations of the entropy decoder 130 are as described above in detail with reference to FIGS. 1 to 5.

In one embodiment, the re-encoding apparatus 100 may include the re-encoder 120, the quantization table obtainer 160, an entropy table obtainer 410, and the entropy decoder 130. However, the re-encoding apparatus 100 may further include other elements or may include only some of these elements.

In one embodiment, the entropy table obtainer 410 may include a low-resolution image obtainer 610, a symbol redistributor 620, a symbol statistics calculator 630, and a table generator 640. However, the entropy table obtainer 410 may further include other elements or include only some of these elements.

The low-resolution image obtainer 610 may obtain a low-resolution image of the input image. In one embodiment, the low-resolution image may be an image obtained by reducing the size of an original image. For example, the low-resolution image may be an image having a resolution of 512×288 obtained by reducing the size of an original image having a resolution of 4128×2333. As another example, the low-resolution image may be a thumbnail image. In one embodiment, the thumbnail image may be an image obtained by reducing the size of the original image.

The low-resolution image obtainer 610 may obtain a low-resolution image of the input image from the input bitstream.

For example, when information regarding the low-resolution image of the input image is included in a header of the input bitstream, the entropy decoder 130 may receive the low-resolution image of the input image from the input bitstream. Alternatively, the low-resolution image obtainer 610 may obtain the low-resolution image from the entropy decoder 130.

As another example, when the low-resolution image cannot be received from the input bitstream, the low-resolution image obtainer 610 may obtain the low-resolution image by re-sizing an image reconstructed by the decoder 110. For example, the low-resolution image obtainer 610 may obtain the low-resolution image of the input image by adjusting the resolution of the reconstructed image to a certain resolution.

The obtaining of the low-resolution image of the input image by the low-resolution image obtainer 610 may be optional. For example, the low-resolution image obtainer 610 may obtain the low-resolution image and output it to the symbol redistributor 620 only when the header of the input bitstream contains information regarding the low-resolution image of the input image.

The output low-resolution image may be used to generate an entropy table.

For example, the symbol statistics calculator 630 may predict the frequency of symbols by using the low-resolution image. The table generator 640 may generate an entropy table by using the frequency of the symbols predicted by the symbol statistics calculator 630.

As another example, the symbol redistributor 620 may redistribute a symbol by using the low-resolution image. A symbol used to encode or decode the low-resolution image may be different from that used to encode or decode the original image. Thus, in one embodiment, the symbol redistributor 620 may replace the symbol used to encode or decode the low-resolution image with that used to re-encode the reconstructed image. Symbol redistribution will be described with respect to the symbol redistributor 620 below.

In one embodiment, the low-resolution image obtainer 610 may determine whether the low-resolution image is to be received from the input bitstream.

In one embodiment, when the low-resolution image may be received from the input bitstream, the low-resolution image obtainer 610 may receive the low-resolution image from the input bitstream. For example, information regarding the low-resolution image may be included in the header of the input bitstream. The low-resolution image obtainer 610 may obtain the low-resolution image by using the information regarding the low-resolution image received from the input bitstream. In this case, a process of generating the low-resolution image may be omitted.

In another embodiment, when the low-resolution image cannot be received from the input bitstream, the low-resolution image obtainer 610 may parse the input bitstream to generate the low-resolution image. The information regarding the low-resolution image may not be included in the input bitstream. In this case, the low-resolution image obtainer 610 may generate the low-resolution image by using information regarding the reconstructed image. For example, the low-resolution image obtainer 610 may generate the low-resolution image by using information obtained by sampling pixel information regarding the reconstructed image at a predetermined ratio.

In one embodiment, the re-encoding apparatus 100 when the low-resolution image is a thumbnail image will be described with reference to FIG. 9 below.

The symbol redistributor 620 may redistribute symbols to be used for the entropy table.

For example, the entropy decoder 130 may replace symbols to be entropy decoded with those to be entropy encoded by the entropy encoder 190.

As another example, symbols used to encode or decode the low-resolution image may be replaced with those used to encode or decode the original image.

Symbols to be entropy decoded by the entropy decoder 130 may be determined on the basis of a first quantization table used to encode the input image into the input bitstream. In contrast, symbols to be entropy encoded by the entropy encoder 190 may be determined on the basis of a second quantization table used to re-encode the reconstructed image.

Thus, the symbols to be entropy decoded by the entropy decoder 130 may be different from those to be entropy encoded by the entropy encoder 190. Thus, the symbol redistributor 620 may redistribute the symbols to be entropy decoded by the entropy decoder 130 with those to be entropy encoded by the entropy encoder 190. Thus, the entropy table obtainer 410 may generate an entropy table including the symbols entropy encoded by the entropy encoder 190.

For example, when "100100" which is a symbol to be entropy decoded by the entropy decoder 130 is changed to "10010" in a re-encoding process due to different quantization tables, a symbol to be used by the entropy table obtainer 410 may be "10010" other than "100100".

In one embodiment, the symbol redistributor 620 may be operated only when the quantization table obtainer 160 is provided. For example, in an embodiment in which the quantization table obtainer 160 is omitted, the symbol redistributor 620 may be omitted.

The symbol statistics calculator 630 may obtain information regarding the frequency of symbols. The symbol statistics calculator 630 may calculate statistics regarding the symbols using the frequency of the symbols. The symbol statistics calculator 630 may calculate the statistics regarding the symbols on the basis of the symbols redistributed by the symbol redistributor 620.

For example, "100100" which is a symbol to be entropy decoded by the entropy decoder 130 may be changed to "10010" in a re-encoding process due to different quantization tables.

A histogram may be drawn using the frequency of symbols. An embodiment of the histogram will be described in detail with reference to FIG. 8 below.

In one embodiment, the symbol statistics calculator 630 may predict the frequency of symbols to be encoded by the entropy encoder 190 by using a low-resolution image obtained by the low-resolution image obtainer 610. The symbol statistics calculator 630 may output information regarding the predicted frequency to the table generator 640. The table generator 640 may generate an entropy table, which is to be used by the entropy encoder 190, by using the predicted frequency.

The table generator 640 may generate an entropy table to be used to perform entropy encoding by the entropy encoder 190. For example, an entropy table may be generated adaptively to the input image by using a result of statistics obtained by the symbol statistics calculator 630.

The entropy table has been defined above with reference to FIG. 4.

In one embodiment, the table generator 640 may determine the length of a bit string corresponding to a symbol to be entropy encoded on the basis of the frequency of the symbol corresponding to the bit string. For example, the table generator 640 may generate an entropy table such that the length of a bit string corresponding to a first symbol among symbols to be entropy encoded during re-encoding of a reconstructed image is shorter or equal to that of a bit string corresponding to a second symbol of lower frequency than that of the first symbol. The table generator 640 may obtain information regarding the frequency of each symbol through the symbol statistics calculator 630.

In one embodiment, the table generator 640 generates an entropy table on the basis of the frequency of each symbol related to an input bitstream or a probability of occurrence of each symbol and may thus generate an entropy table adaptively to an input image or a reconstructed image. Thus, in one embodiment, the table generator 640 generates an entropy table corresponding to the input image or the reconstructed image.

In another embodiment, the table generator 640 may select one of a plurality of entropy tables set beforehand on the basis of the statistics obtained by the symbol statistics calculator 630.

In another embodiment, the table generator 640 may store a plurality of entropy tables according to expected features of an image to be re-encoded. For example, the table generator 640 may store an entropy table for efficiently re-encoding an image, such as a seascape, in which a degree of change in the values of samples is not generally large. As another example, the table generator 640 may store an entropy table for efficiently re-encoding an image, such as a townscape, in which a degree of change in the values of samples is relatively large.

In one embodiment, the table generator 640 may determine one of a plurality of entropy tables stored beforehand on the basis of the frequency of symbols entropy decoded by the entropy decoder 130 or a probability of occurrence of the symbols, and output the determined entropy table to the entropy encoder 190.

For example, the table generator 640 may obtain a histogram regarding the frequency of symbols entropy decoded by the entropy decoder 130 or a probability of occurrence of the symbols, and output to entropy encoder 190 an entropy table most similar to the histogram among a plurality of entropy tables stored beforehand.

The re-encoder 120 may re-encode a reconstructed image by using the entropy table generated by the table generator 640. For example, the entropy encoder 190 may entropy encode a quantized transformation coefficient received from the quantizer 180 by using the entropy table generated by the entropy table obtainer 410.

Figure 7A:
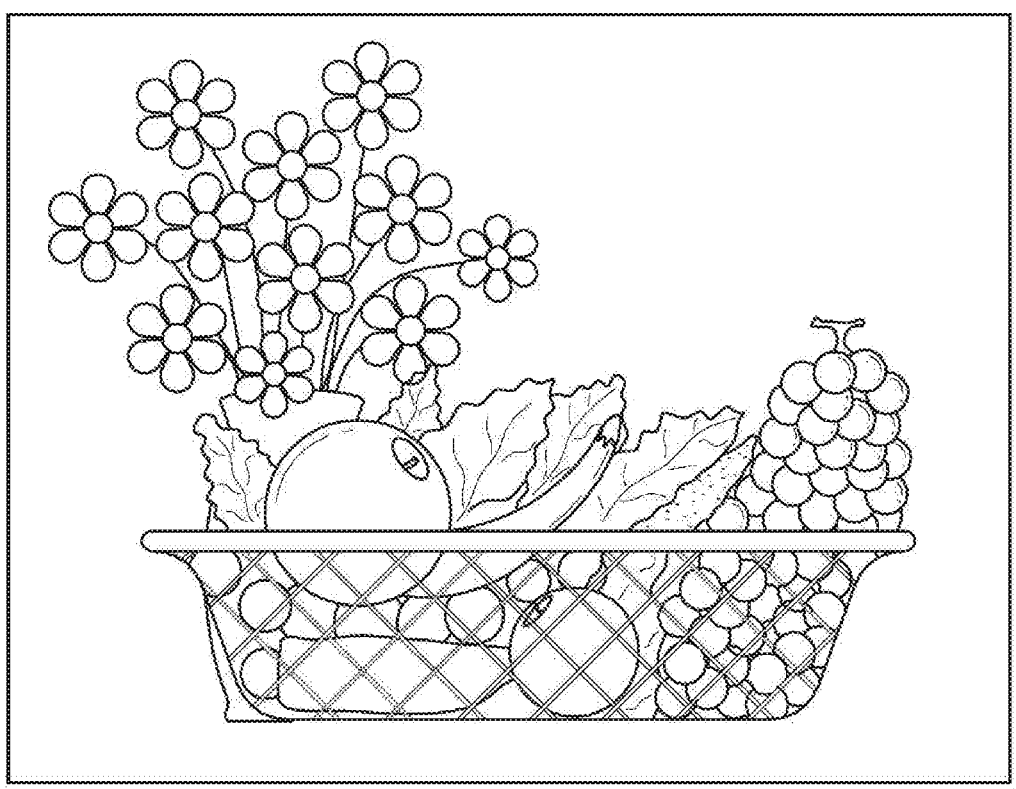
FIGS. 7A and 7B are diagrams illustrating an original image and a low-resolution image thereof to be used in a re-encoding process, according to an embodiment.
Figure 7B:
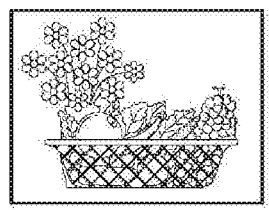

FIGS. 7A and 7B are diagrams illustrating an original image and a low-resolution image thereof to be used in a re-encoding process, according to an embodiment.

An image of FIG. 7A is an original image. An image of FIG. 7B is a low-resolution image of the original image.

As illustrated, the low-resolution image according to an embodiment may be understood as an image obtained by reducing the size of the original image. For example, the original image of FIG. 7A may have a resolution of 4128× 2333, and the low-resolution image of FIG. 7B may have a resolution of 512×288.

Figure 8:
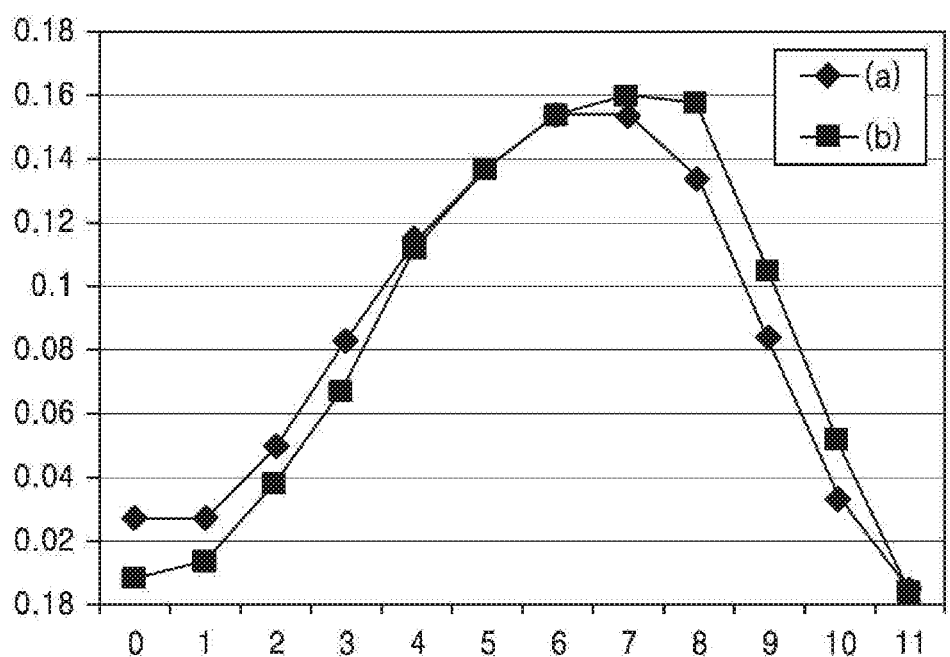
FIG. 8 is a diagram illustrating a histogram representing the frequency of each symbol obtained by a symbol statistics calculator, according to an embodiment.

FIG. 8 is a diagram illustrating a histogram representing the frequency of each symbol obtained by the symbol statistics calculator 630, according to an embodiment.

In FIG. 8, a vertical axis may represent a relative value of the frequency of each of symbols or a probability of occurrence of each of the symbols. In FIG. 8, a horizontal axis may represent each of the symbols. In one embodiment, the probability of occurrence of each of the symbols may be understood as a number of times a specific symbol occurs of a number of times all the symbols occur. In one embodiment, the frequency of each of the symbols may be understood as a number of times each of the symbols occurs.

A plot indicated by (a) is a histogram regarding an original image, and a plot indicated by (b) is a histogram regarding a low-resolution image.

As illustrated in FIG. 8, a histogram regarding a probability of occurrence of symbols related to the original image and a histogram regarding a probability of occurrence of symbols related to the low-resolution image may be substantially the same. When a low-resolution image may be obtained, the re-encoding apparatus 100 may generate or determine an entropy table by using the low-resolution image.

Figure 9:
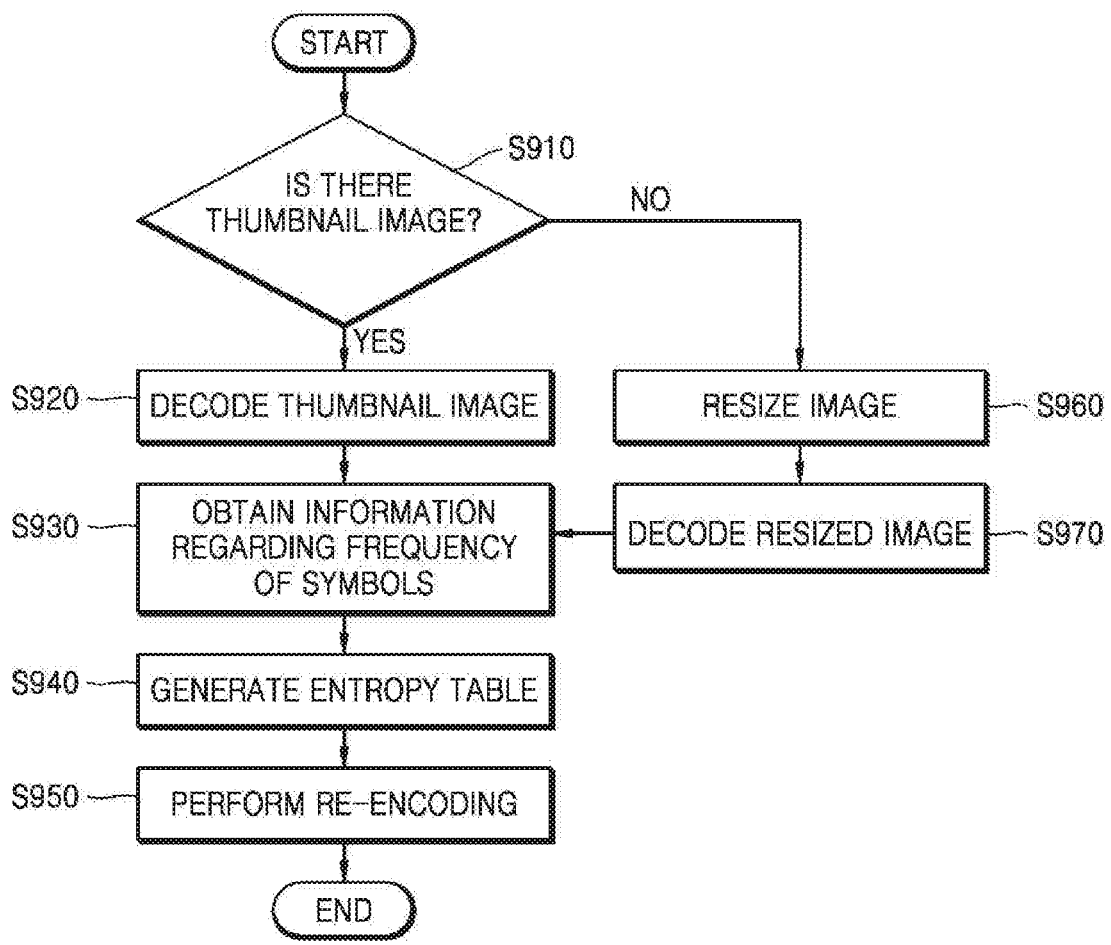
FIG. 9 is a flowchart of a method of re-encoding a reconstructed image according to whether there is a thumbnail image, according to an embodiment.

FIG. 9 is a flowchart of operations performed by the re-encoding apparatus 100 of FIG. 6. In detail, FIG. 9 is a flowchart of a method of re-encoding a reconstructed image according to whether there is a thumbnail image, according to an embodiment.

In operation S910, the re-encoding apparatus 100 may determine whether there is a thumbnail image. For example, the re-encoding apparatus may determine whether information regarding a thumbnail image is to be obtained by parsing an input bitstream to determine whether there is a thumbnail image. As another example, the re-encoding apparatus may determine whether information regarding a thumbnail image is to be obtained from the input bitstream during obtaining information parsed by performing entropy decoding.

In one embodiment, the information regarding the thumbnail image may be included in a header of the input bitstream. Furthermore, the re-encoding apparatus according to an embodiment may determine whether there is information regarding a thumbnail image by parsing the header of the input bitstream.

In operation S920, the re-encoding apparatus may decode the thumbnail image. For example, a low-resolution image obtainer may decode the thumbnail image by obtaining information regarding the thumbnail image. In one embodiment, the low-resolution image obtainer may output the decoded thumbnail image to a symbol redistributor or a symbol statistics calculator.

In operation S930, the re-encoding apparatus may obtain information regarding the frequency of symbols.

For example, the re-encoding apparatus may obtain information regarding the frequency of symbols related to an obtained thumbnail image or a resized image. The re-encoding apparatus may obtain a histogram regarding a probability of occurrence of each of the symbols or the frequency of each of the symbols. The re-encoding apparatus may analyze the obtained histogram.

In one embodiment, the re-encoding apparatus may predict the frequency of the symbols by using a resized image. In operation S940, the re-encoding apparatus may generate an entropy table, based on the predicted frequency of the symbols.

In operation S960, the re-encoding apparatus may resize an image. For example, the re-encoding apparatus may receive a reconstructed image obtained by performing decoding, and obtain a resized image by resizing the reconstructed image. In one embodiment, a resolution of the resized image may be the same as a predetermined resolution or a resolution of an original image downscaled at a predetermined ratio. As another example, the re-encoding apparatus may obtain information regarding a resized image by receiving only information regarding an input image from entropy decoded data. Furthermore, the re-encoding apparatus may obtain the resized image by decoding the information regarding the resized image in operation S970 to be described below.

In operation S970, the re-encoding apparatus may decode the resized image. For example, the re-encoding apparatus may obtain a decoded resized image by decoding information regarding the resized image obtained through entropy decoding. Furthermore, the re-encoding apparatus may redistribute symbols or calculate statistics of symbols with respect to the resized image.

In operation S940, the re-encoding apparatus may generate an entropy table. For example, the re-encoding apparatus may generate an entropy table to be used to entropy encode the symbols on the basis of a result of analyzing a histogram by calculating statistics of the symbols. Alternatively, the re-encoding apparatus may select an entropy table to be used to entropy encode the symbols from among a plurality of predetermined entropy tables, based on the result of analyzing the histogram by calculating statistics of the symbol.

A method of generating the entropy table has been described above in detail with reference to FIGS. 4 and 6.

In operation S950, the re-encoding apparatus may perform re-encoding using the entropy table generated or selected in operation S940. For example, the re-encoding apparatus may entropy encode a quantized transformation coefficient by using the entropy table generated or selected in operation S940.

A method of performing re-encoding is as described in detail above with reference to FIGS. 4 and 6.

A bitstream output from the re-encoding apparatus 100 may be decoded. A process of decoding an output bitstream output from the re-encoding apparatus 100 will be described below.

The output bitstream output from the re-encoding apparatus 100 may be decoded by a re-decoding apparatus (not shown). The re-decoding apparatus may obtain an output image by decoding the output bitstream received from the re-encoding apparatus 100. The quality of the output image may be lower than that of a reconstructed image but the difference between the qualities of the output image and the reconstructed image may be restricted to be in a predetermined range. For example, the difference between a PSNR of the reconstructed image and a PSNR of the output image may be restricted to be in the predetermined range. The re-decoding apparatus may generate a quantization table and an entropy table, and the quality of the output image may be determined according to the quantization table or the entropy table.

In one embodiment, the re-decoding apparatus may parse the output bitstream to obtain the quantization table or the entropy table used to re-encode the reconstructed image.

In one embodiment, the re-decoding apparatus may entropy decode the output bitstream by using the entropy table obtained by parsing the output bitstream. For example, the re-decoding apparatus may entropy decode the output bitstream by using the entropy table used to perform entropy encoding by the entropy encoder 190.

In one embodiment, the re-decoding apparatus may inversely quantize a quantized transformation coefficient which is entropy decoded. In one embodiment, the re-decoding apparatus may use a second quantization table used by the quantizer 180 to perform inverse quantization.

In one embodiment, the re-decoding apparatus may inversely transform a transformation coefficient obtained through inverse quantization. For example, the re-decoding apparatus may inversely transform the transformation coefficient by performing inverse discrete cosine transform (IDCT). In one embodiment, the re-decoding apparatus may reconstruct the output image by inversely transforming the transformation coefficient.

The above embodiments can be embodied as a computer program and executed using a general-purpose digital computer via a computer-readable recording medium. Examples of the computer-readable recording medium include storage media such as a magnetic recording medium (e.g., a ROM, a floppy disc, a hard disc, etc.) and an optical recording medium (e.g., a CD-ROM, a DVD, etc.).

A disc 26000 which is a computer-readable recording medium having recorded thereon a program according to an embodiment will be described below.

Figure 10:
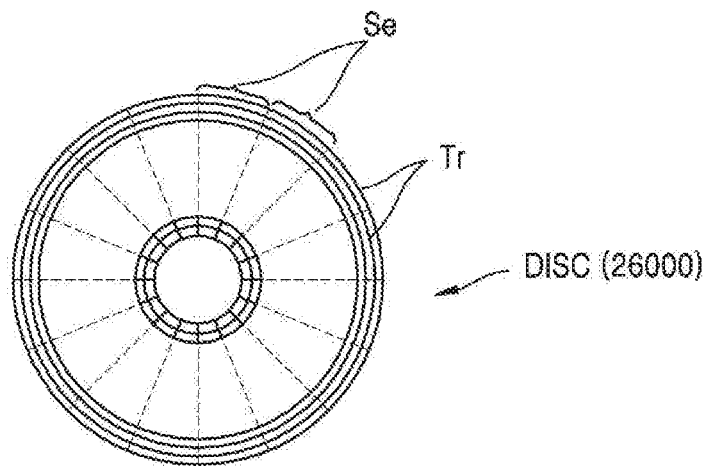
FIG. 10 illustrates a physical structure of a disc having stored therein programs according to various embodiments.

FIG. 10 illustrates a physical structure of a disc 26000 configured to store programs according to various embodiments. The disc 26000 may be a storage medium such as a hard drive, a CD-ROM disc, a Blu-ray disc, or a DVD disc. The disc 26000 includes a plurality of concentric tracks tr, each of which is divided into a certain number of sectors Se in a circumferential direction thereof. In a specific region of the disc 26000 configured to store a program according to one embodiment, a program for performing a method of determining a quantization parameter, a video encoding method, and a video decoding method as described above may be allocated and stored.

A computer system using a storage medium for storing a program to perform a video encoding method and a video decoding method as described above will be described with reference to FIG. 11 below.

Figure 11:
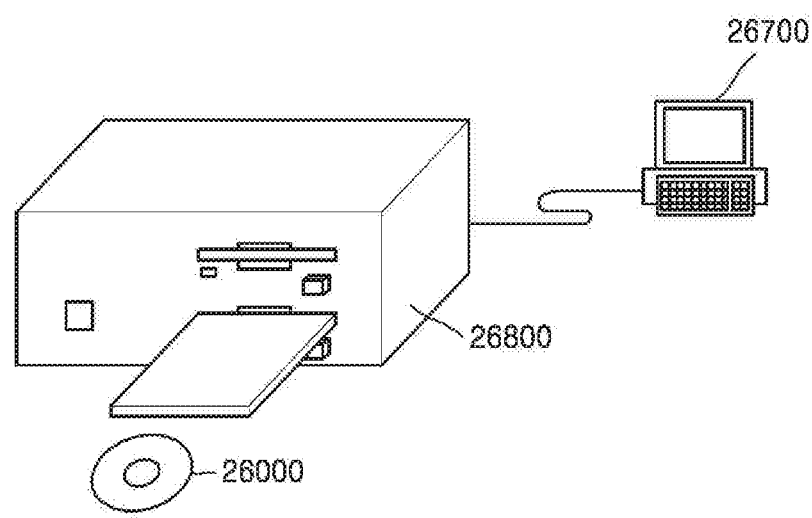
FIG. 11 illustrates a disc drive for recording and reading a program by using a disc.

FIG. 11 illustrates a disc drive 26800 for recording and reading a program by using the disc 26000. A computer system 26700 may store a program for performing a re-encoding method according to the present disclosure in the disc 26000 by using the disc drive 26800. To execute the program stored in the disc 26000 in the computer system 26700, the program may be read from the disc 26000 by the disc drive 26800, and transmitted to the computer system 26700.

The program for performing the re-encoding method according to the present disclosure may be stored in a memory card, a ROM cassette, and a solid-state drive (SSD), as well as the disc 26000 illustrated in FIGS. 10 and 11.

In this case, a user terminal may include the re-encoding apparatus 100 according to the present disclosure described above.

Various embodiments in which the re-encoding method and apparatus described above described above are applied are described above with reference to FIGS. 10 and 11. However, various embodiments in which the re-encoding method described above is stored in a recording medium or the re-encoding apparatus 100 is embodied in a device are not limited to the embodiments of FIGS. 10 and 11.

In the present disclosure, the terms 'comprise' and/or 'comprising,' when used in this specification, specify the presence of stated elements, but do not preclude the presence or addition of one or more other elements.

It would be apparent to those of ordinary skill in the technical field to which the various embodiments set forth herein pertain that various changes may be made in these embodiments in form and details without departing from the essential features thereof. Thus, these embodiments should be considered in descriptive sense only and not for purposes of limitation. Therefore, the scope of the present disclosure is defined not by the detailed description described above but by the appended claims, and all differences within the scope will be construed as being included in the present disclosure.

The invention claimed is:

1. A re-encoding method, performed by a re-encoding apparatus which comprises a processor and a memory, comprising:
obtaining a first quantization table from a bitstream including an image encoded using the first quantization table;
obtaining a second quantization table by multiplying predetermined values to values corresponding to elements of the first quantization table, the second quantization table including elements respectively corresponding to the elements of the first quantization table;
obtaining histogram of a low-resolution image based on the bitstream;
obtaining an entropy table used to perform entropy encoding, based on the histogram, and
re-encoding a reconstructed image by using the second quantization table and the entropy table, the reconstructed image being obtained by decoding the encoded image by using the first quantization table,
wherein the predetermined value multiplied to a first value among the values corresponding to the elements of the first quantization table and the predetermined value multiplied to a second value among the values corresponding to the elements of the first quantization table is different each other.

2. The re-encoding method of claim 1, wherein an element of the second quantization table corresponding to an element having a larger value among two elements of the first quantization table has a value larger than or equal to that of an element of the second quantization table corresponding to the other element having a smaller value among the two elements.

3. The re-encoding method of claim 1, wherein the elements of the second quantization table have values larger than those of the elements of the first quantization table corresponding to the elements of the second quantization table.

4. The re-encoding method of claim 1, wherein the obtaining of the second quantization table comprises:
obtaining an average luminance value of a region quantized by using the first quantization table; and
obtaining the second quantization table based on the average luminance value.

5. The re-encoding method of claim 1, wherein an element of the second quantization table to be used to quantize a direct-current (DC) transformation coefficient has a value larger than that of an element of the first quantization table to be used to quantize the DC transformation coefficient.

6. The re-encoding method of claim 1, wherein the obtaining of the histogram of the low-resolution image comprises:
determining whether or not the low-resolution image is to be received from the bitstream; and
receiving the low-resolution image from the bitstream when it is determined that the low-resolution image is to be received from the bitstream.

7. The re-encoding method of claim 6, wherein, when it is determined that the low-resolution image is not to be received from the bitstream, the obtaining of the histogram of the low-resolution image further comprises parsing the bitstream to generate the low-resolution image.

8. A re-encoding apparatus, which comprises a processor and a memory, comprising:
a quantization table obtainer configured to obtain a first quantization table from a bitstream including an image encoded using the first quantization table, and obtain a second quantization table by multiplying predetermined values to values corresponding to elements of the first quantization table, the second quantization table including elements respectively corresponding to the elements of the first quantization table;
an entropy table obtainer configured to obtain histogram of a low-resolution image based on the bitstream and obtain an entropy table used to perform entropy encoding, based on the histogram; and
a re-encoder configured to re-encode a reconstructed image by using the second quantization table and the entropy table, the reconstructed image being obtained by decoding the encoded image by using the first quantization table,
wherein the predetermined value multiplied to a first value among the values corresponding to the elements of the first quantization table and the predetermined value multiplied to a second value among the values corresponding to the elements of the first quantization table is different each other.

9. The re-encoding apparatus of claim 8, wherein an element of the second quantization table corresponding to an element having a larger value among two elements of the first quantization table has a value larger than or equal to that of an element of the second quantization table corresponding to the other element having a smaller value among the two elements.

10. The re-encoding apparatus of claim 8, wherein the elements of the second quantization table have values larger than those of the elements of the first quantization table corresponding to the elements of the second quantization table.

11. The re-encoding apparatus of claim 8, wherein the quantization table obtainer obtains an average luminance value of a region quantized by using the first quantization table, and obtains the second quantization table based on the average luminance value.

12. The re-encoding apparatus of claim 8, wherein an element of the second quantization table to be used to quantize a direct-current (DC) transformation coefficient has a value larger than that of an element of the first quantization table to be used to quantize the DC transformation coefficient.

* * * * *